Sept. 15, 1925.
W. CLAYPOOLE
TESTING SYSTEM
Filed July 22, 1921
1,553,802
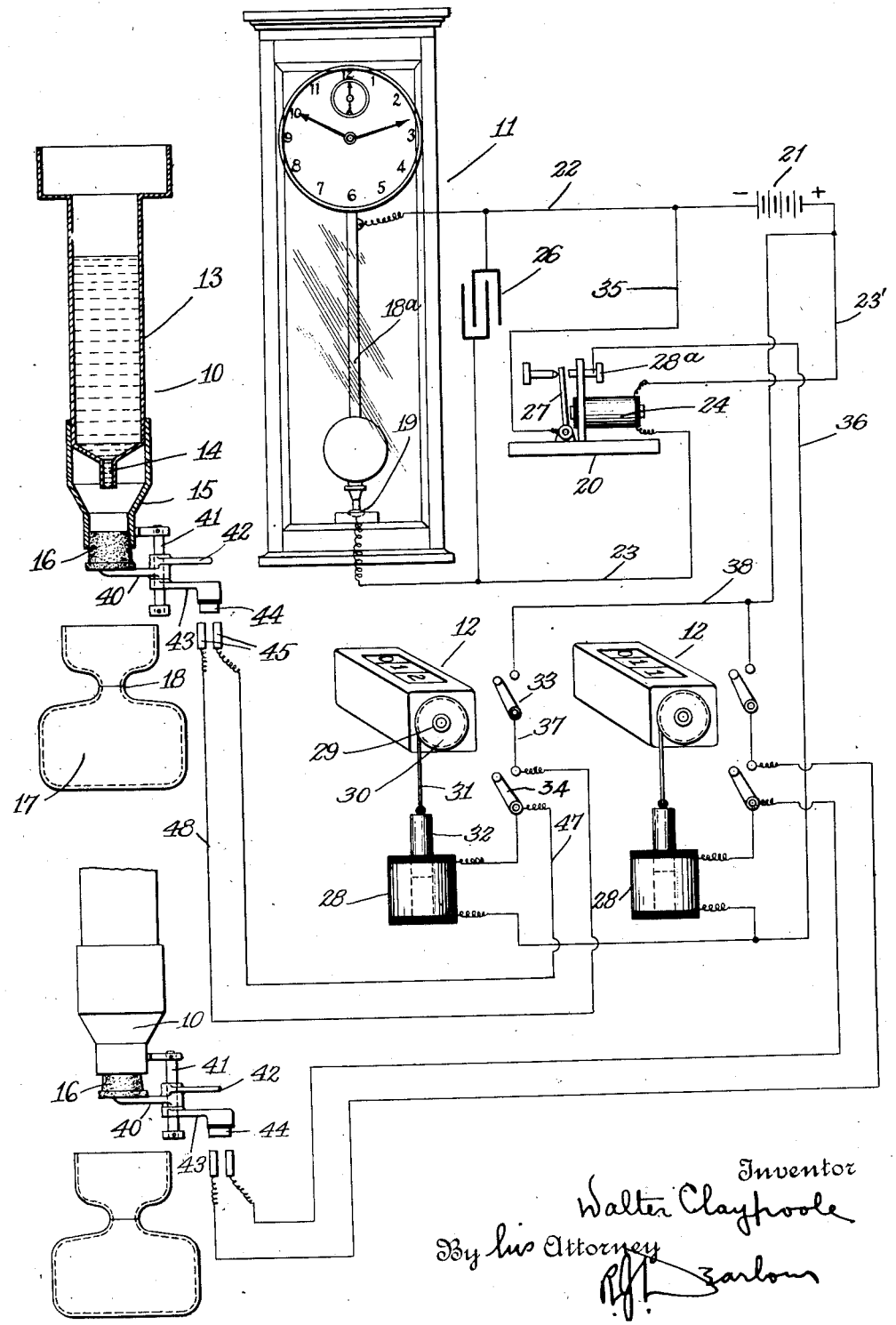
Inventor
Walter Claypoole
By his Attorney Patented Sept. 15, 1925.

1,553,802

UNITED STATES PATENT OFFICE.

WALTER CLAYPOOLE, OF FOREST HILLS, NEW YORK, ASSIGNOR TO THE TEXAS COMPANY, OF NEW YORK, N. Y., A CORPORATION OF TEXAS.

TESTING SYSTEM.

Application filed July 22, 1921. Serial No. 486,866.

*To all whom it may concern:*

Be it known that I, WALTER CLAYPOOLE, a subject of the Crown of Great Britain, and a resident of Forest Hills, Long Island, county of Queens, and State of New York, have invented certain new and useful Improvements in Testing Systems, of which the following is a specification, reference being had to the accompanying drawing, forming a part thereof.

This invention relates to testing systems in which it is necessary to determine the time interval required for a certain operation, and it has a special reference to systems for testing the viscosity of fluids, although the invention is not so restricted but is capable of general application.

The viscosity of fluids is commonly tested by determining the time interval required for a certain amount of fluid to flow through the orifice of the viscosimeter of the efflux type, a well known example of which is the Saybolt viscosimeter. In measuring the time element required, it is common practice to employ a stop watch which is set into operation when the flow of the fluid is initiated and which is stopped when a predetermined amount of the fluid has been collected in a suitable graduated receptacle, the lapse of time in seconds being a measure of the viscosity of the fluid. Such a procedure and the viscosity determinations resulting therefrom are subject to the inaccuracies of the stop watch and to liability of errors in the reading of the watch and the computation of the time element in seconds. Moreover, in a laboratory where many stop watches are employed, an excessive amount of time and expense is involved in repairing the watches and keeping them in satisfactory operating condition.

Accordingly it is one of the objects of the present invention to provide a testing system which is particularly adapted for measuring the viscosity of fluids, although it may be utilized for many other purposes, in which the use of stop watches is avoided, thereby eliminating the several difficulties hereinbefore mentioned which are inherent in the use of such watches.

Another object of the invention is to provide a testing system of the above indicated character which shall be simple and accurate in operation and which shall be particularly adapted for laboratory use where a plurality of testing devices may be in use at the same time.

In accordance with the present invention, I employ, in connection with a testing device or testing devices, such as viscosimeters of the general character above referred to, a master clock which is electro-magnetically associated with a suitable counter or counters in such manner that the time element in seconds required by any particular testing device is indicated directly by its corresponding counter which is actuated in accordance with the operation of the clock. In certain instances the stopper of the viscosimeter is withdrawn by means of a suitable device which establishes the necessary electrical connections, so that the operation of the testing device and the operation of the counter are initiated concurrently. In another form of the invention a suitable manually controlled switch is provided in the energizing circuit of the electro-magnetically operated counter, and this switch is closed by the operator concurrently with the beginning of the testing period. In either case, the periodic actuation of the counter is initiated at the time that the testing device is thrown into operation and serves to progressively count the seconds as the test proceeds and eventually indicates directly the time interval in seconds when the test is completed.

The invention will be best understood by reference to the accompanying drawing, which, for illustrative purposes, shows the testing system employed in connection with the use of viscosimeters, as an example of testing device to which the invention is specially applicable.

The single figure of the accompanying drawing is a diagrammatic view of a testing system constituting a preferred embodiment of the invention.

Referring to the drawing, the system comprises in general a plurality of testing devices 10, a master clock 11, and a plurality of electro-magnetically operated counters 12, which are arranged and connected to be used in connection with the respective testing devices 10.

The testing devices 10 illustrated are of like construction and comprise viscosimeters of the Saybolt efflux type. Each of the viscosimeters comprises a tubular fluid container 13, having a restricted orifice 14 at its lower end and provided with a neck portion 15 below the orifice, which is adapted to receive a stopper 16. Below the viscosimeter a suitable receptacle 17 is disposed for the purpose of receiving the fluid as it flows from the orifice of the instrument after the stopper has been withdrawn, said receptacle being provided with a mark or graduation 18 to indicate a predetermined amount of fluid, which must flow from the testing device during the testing period.

The master clock 11 may be of any suitable construction and as shown, embodies a swinging pendulum 18a, the tip of which is adapted to pass periodically through a mercury bath 19, during which instant a primary circuit is established through a relay 20, thereby energizing the relay from a suitable source of electrical energy, such as a battery 21 in accordance with the swinging movements or beats of the clock pendulum. This circuit includes a connection 22 from one side of the battery, the pendulum 18a, the mercury bath 19, a connection 23, a relay magnet 24, and a connection 23′ to the other side of the battery. A suitable condenser 26 is provided in parallel with the make and break apparatus comprising the pendulum and the mercury bath, in accordance with well-known practice. At each of the periodic energizations of the relay 20, its armature 27 is eletcro-magnetically actuated to complete a secondary circuit through one or more of the energizing coils 28 of the electro-magnetically operated counters 12.

Each of these counters may be of any suitable construction and is adapted to progressively indicate or count the number of its actuations. A suitable counter of this type is the well known Veeder counter, the construction and operation of which needs no explanation. Attached to the shaft 29 of each counter is a pulley 30 to which one end of a flexible cord 31 is suitably secured, the other end thereof being attached to an iron core 32, which comprises a part of the electro-magnet 28, suitable means in the form of a spring (not shown) being embodied in the counter for the purpose of re-setting the device, together with its pulley and attached solenoid after each actuation thereof. By reason of this construction, it will be understood that at each energization of the electro-magnet 28, its core 32 will be drawn downwardly, whereby the counter will receive an actuation sufficient to cause it to progressively indicate the number of actuations it has received.

In a laboratory in which a plurality of testing devices are employed, the several counters will be located conveniently near the testing devices with which they are to be operated and also suitable control switches 33 and 34 will be similarly arranged for the convenient manipulation of the operator conducting the test.

Before conducting a test the operator first closes the proper switch 33 associated with the testing device which he is to employ, thereby connecting the proper counter into circuit.

In accordance with one mode of operation, the switch 34, associated with the testing device and counter to be employed during the test, is closed before the test is started and at the moment that the operator withdraws or removes the stopper 16 from the testing device, thereby starting the testing period, he concurrently closes the switch 33 associated with the counter to be employed, thereby simultaneously starting the test and the actuation of the counter in the manner now to be described. At each energization of the primary relay 20, its armature 27 is actuated to complete an energizing circuit from one side of the battery 21 or other source of electrical energy, which includes the connection 22, connection 35, armature 27 and contact member 28a of the primary relay 20, connection 36, energizing coil of the electro-magnet 28, switch 34, connection 37, switch 33 and connection 38 to the other side of the battery 21. The electro-magnet 28 is thereby energized periodically at each swing of the pendulum of the master clock and, therefore, the associated counter 12 is actuated periodically in accordance with the operation of the said clock to count or directly indicate the time interval in seconds required for the passage of a predetermined amount of fluid from the testing device. When this given amount of fluid has flowed into the receptacle 17, as indicated by the graduation or mark 18, the operator opens the proper switch 33 and thereby discontinues the actuations of the counter 12. The reading of the counter then indicates directly the total number of seconds required for the fluid to pass the testing device, which time is a measure of the viscosity of the fluid.

Another mode of operation contemplates the employment of a suitable mechanical device for removing or withdrawing the stopper from the testing instrument and concurrently establishing the proper electrical connection through a switch associated with the stopper removing device so as to initiate the actuation of the counter concurrently with the beginning of the testing period.

It is in connection with this arrangement of the system or mode of operation that the switch 34 is employed, said switch being thrown to its open position whenever the system is to be operated in this manner and being closed when the operation of the system is carried out in the manner already described.

The stopper removing device, referred to, conveniently comprises an arm 40 to which the stopper is attached and which is slidable vertically on a rod 41 when so actuated by the operator through the agency of a handle 42. This arm 40 is also mechanically associated with an arm 43, carrying an electrical contact or switch member 44, which is adapted to instantly bridge stationary contact terminals 45 whenever the stopper is removed. A rotary connection is provided between the arms 40 and 43 in order to permit the arm 40, with its attached stopper, to be swung out of position beneath the testing device as soon as the stopper is withdrawn and the operation of said testing device begins.

In utilizing the invention in the manner just referred to, the switch 34, corresponding to the testing device and counter to be used, is first opened, the switch 33 being closed. When everything is in readiness for the test, the operator by manipulating the handle 42 withdraws the stopper from the testing device and concurrently closes the switch, comprising contact members 44 and 45, which is associated therewith. By so doing, the electro-magnet 28 of the proper counter 12 is energized at each swing of the master clock pendulum, through a circuit from one side of the battery 21 which includes connection 35, armature 27, contact 28ª, connection 36, electro-magnet 28, connection 47, contact members 44 and 45, connection 48, connection 37, switch 33 and connection 38, to the other side of the battery. Thus, the actuation of the proper counter is initiated concurrently with the beginning of the testing period and the counter progressively indicates the time interval until the required amount of fluid has passed the testing device and the operator has opened the switch 33.

Obviously any number of testing devices and counters may be employed, although only a single primary circuit and relay is required, irrespective of the number of counters used. Moreover, many modifications may be made in the system without departing from the spirit and scope of the invention. Therefore, only such limitations should be imposed as are indicated in the appended claims.

Having described my invention, what I claim as new and desire to secure by Letters Patent is:

1. In a testing system, the combination with a viscosimeter of the efflux type having a removable closure for its orifice, a master clock and a counter, of electrical means adapted to be put into operation when the orifice closure is removed for causing the counter to be actuated in accordance with the operation of said master clock.

2. In a testing system, the combination with a viscosity testing device of the efflux type, having a removable closure for its orifice, a master clock, an electro-magnetically operable counter, and means whereby said counter may be operated by said clock, of means including mechanism for removing said closure from the orifice of said testing device for initiating the operation of the counter and causing it to be actuated in accordance with the operation of said master clock.

3. In a testing system, the combination with a viscosimeter of the efflux type having a removable closure for its orifice, a master clock, a counter, and means whereby said counter may be operated by said clock, of mechanism for removing said orifice closure, and electrical means including a switch adapted to be closed by said closure-removing means for causing the counter to be actuated in accordance with the operation of said master clock.

4. In a testing system the combination with a viscosimeter of the efflux type having a removable closure for its orifice, an electro-magnetic relay, and auxiliary control means including a master clock for periodically energizing the relay, of a main operating circuit controlled by said relay and including an electro-magnetic actuating device periodically energized in response to the operation of the relay, a counter operated by said actuating device, and means in the main operating circuit and operable independently of the viscosimeter closure for closing the main operating circuit to initiate the operation of the counter concurrently with the separate removal of the viscosimeter closure.

In witness whereof I have hereunto set my hand this 6th day of July 1921.

W. CLAYPOOLE.